United States Patent
Park et al.

(10) Patent No.: US 12,432,038 B2
(45) Date of Patent: Sep. 30, 2025

(54) CROSS-CARRIER SCHEDULING METHOD AND APPARATUS IN NEXT-GENERATION MOBILE COMMUNICATION SYSTEM

(71) Applicant: SAMSUNG ELECTRONICS CO., LTD., Suwon-si (KR)

(72) Inventors: Suyoung Park, Suwon-si (KR); Soenghun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 404 days.

(21) Appl. No.: 17/953,786

(22) Filed: Sep. 27, 2022

(65) Prior Publication Data

US 2023/0092891 A1  Mar. 23, 2023

Related U.S. Application Data

(63) Continuation of application No. PCT/KR2021/002782, filed on Mar. 5, 2021.

(30) Foreign Application Priority Data

Mar. 27, 2020  (KR) .......................... 10-2020-0037678

(51) Int. Cl.
*H04L 5/00* (2006.01)
*H04L 1/00* (2006.01)
*H04W 72/23* (2023.01)

(52) U.S. Cl.
CPC .......... *H04L 5/0098* (2013.01); *H04L 1/0061* (2013.01); *H04L 5/0092* (2013.01); *H04L 5/0094* (2013.01); *H04W 72/23* (2023.01)

(58) Field of Classification Search
CPC ..... H04L 1/0061; H04L 5/001; H04L 5/0053; H04L 5/0092; H04L 5/0094;
(Continued)

(56) References Cited

U.S. PATENT DOCUMENTS 10,512,072 B2  12/2019  Yi et al.
11,489,652 B2 *  11/2022  Takeda .................. H04W 72/23
(Continued)

FOREIGN PATENT DOCUMENTS

EP          4118862 B1 *  12/2024  ........... H04L 1/1896
KR   10-2016-0013505 A     2/2016
KR   10-2019-0029483 A     3/2019

OTHER PUBLICATIONS

International Search Report dated Jun. 16, 2021 issued by the International Searching Authority in counterpart International Application No. PCT/KR2021/002782 (PCT/ISA/210).
(Continued)

*Primary Examiner* — Eric Nowlin

(74) *Attorney, Agent, or Firm* — Sughrue Mion, PLLC

(57) ABSTRACT

A method performed by a terminal in a wireless communication system includes receiving configuration information for a secondary cell (SCell), identifying whether a carrier indicator field (CIF) presence field is included in the configuration information for the SCell, receiving downlink control information for at least one other cell through the SCell based on identifying that a CIF presence field is
(Continued)

included in the configuration information for the SCell, and performing bandwidth part (BWP) switching for the at least one other cell based on the downlink control information.

12 Claims, 12 Drawing Sheets

(58) Field of Classification Search
CPC ............ H04L 5/0098; H04W 72/0453; H04W 72/0457; H04W 72/23; H04W 72/232
See application file for complete search history.

(56) References Cited

U.S. PATENT DOCUMENTS

| | | | | |
|---|---|---|---|---|
| 11,617,195 | B2* | 3/2023 | Huang | H04W 72/23 370/329 |
| 11,743,749 | B2* | 8/2023 | He | H04W 24/08 370/329 |
| 12,212,530 | B2* | 1/2025 | Kim | H04W 72/0453 |
| 2015/0180623 | A1 | 6/2015 | Kim et al. | |
| 2018/0183551 | A1* | 6/2018 | Chou | H04L 5/001 |
| 2019/0103954 | A1* | 4/2019 | Lee | H04L 5/0098 |
| 2019/0124558 | A1* | 4/2019 | Ang | H04L 5/001 |
| 2019/0132109 | A1* | 5/2019 | Zhou | H04L 5/001 |
| 2019/0342907 | A1* | 11/2019 | Huang | H04L 5/0053 |
| 2019/0357238 | A1* | 11/2019 | Zhou | H04W 72/23 |
| 2019/0357262 | A1* | 11/2019 | Cirik | H04L 5/001 |
| 2020/0059939 | A1 | 2/2020 | Lee et al. | |
| 2020/0205041 | A1* | 6/2020 | Ang | H04L 5/0092 |
| 2020/0403763 | A1* | 12/2020 | Takeda | H04W 72/21 |
| 2021/0037505 | A1* | 2/2021 | Kim | H04L 5/0094 |
| 2021/0075581 | A1* | 3/2021 | Takeda | H04L 5/0094 |
| 2021/0368368 | A1* | 11/2021 | He | H04L 5/001 |
| 2022/0046688 | A1* | 2/2022 | Yang | H04W 72/23 |
| 2023/0085896 | A1* | 3/2023 | Takeda | H04W 72/23 370/329 |
| 2024/0039681 | A1* | 2/2024 | Kim | H04L 1/0026 |
| 2024/0137938 | A1* | 4/2024 | Zhou | H04L 5/001 |
| 2024/0397487 | A1* | 11/2024 | Zhou | H04L 5/0005 |

OTHER PUBLICATIONS

International Written Opinion dated Jun. 16, 2021 issued by the International Searching Authority in counterpart International Application No. PCT/KR2021/002782 (PCT/ISA/237).
"Introduction of NR mobility enhancement", R2-2001749, 3GPP TSG-RAN WG2 Meeting #109 electronic, Current Version: 15.8.0, Intel Corporation, Mar. 11, 2020, 526 pages total.
"3rd Generation Partnership Project; Technical Specification Group Radio Access Network; NR; Physical layer procedures for control (Release 16)", 3GPP TS 38.213 V16.0.0 (Dec. 2019), Technical Specification, 3GPP, Jan. 14, 2020, 148 pages total.
"Introduction of 2-step RA", R2-2002380, 3GPP TSG-RAN WG2 Meeting #109e, Current Version: 15.8.0, Ericsson, Mar. 11, 2020, 530 pages total.
"Remaining issues for cross-slot scheduling power saving techniques", R1-2000638, 3GPP TSG RAN WG1 #100-e, Samsung, Feb. 14, 2020, 12 pages total.
"3rd Generation Partnership Project; Technical Specification Group Radio Access Network; NR; Radio Resource Control (RRC) protocol specification (Release 15)", 3GPP TS 38.331 V15.7.0 (Sep. 2019), Technical Specification, 3GPP, Sep. 27, 2019, 527 pages total.
Communication dated Apr. 11, 2025 issued by the Korean Intellectual Property Office in Korean Patent Application No. 10-2020-0037678.
ZTE Corporation, "Discussion on low latency Scell activation", 3GPP TSG RAN WG1 Meeting #98bis, R1- 1910109, Oct. 5, 2019, pp. 1-7 (7 pages total).
Qualcomm Incorporated, "Remaining issues for SCell dormancy", 3GPP TSG RAN WG1 #100-e, R1-2000982, Feb. 15, 2020, pp. 1-8 (8 pages total).
Oppo, "Email report [108#56][DCCA] Scell Dormancy Open Issues (Oppo)", 3GPP TSG RAN WG2 Meeting #109, R2-2000314, Feb. 14, 2020, pp. 1-69 (69 pages total).

* cited by examiner (a)

(b)

(c)

Cross carrier scheduling only from
one component carrier

Cross carrier scheduling from two
component carrier

CROSS-CARRIER SCHEDULING METHOD AND APPARATUS IN NEXT-GENERATION MOBILE COMMUNICATION SYSTEM

CROSS-REFERENCE TO RELATED APPLICATION(S)

This application is a bypass continuation of International Application No. PCT/KR2021/002782, filed on Mar. 5, 2021, in the Korean Intellectual Property Receiving Office, which is based on and claims priority to Korean Patent Application No. 10-2020-0037678, filed on Mar. 27, 2020, In the Korean Intellectual Property Office, the disclosures of which are incorporated by reference herein in their entireties.

BACKGROUND

1. Field

The present disclosure relates generally to a mobile communication system, more particularly, to a cross-carrier scheduling method and apparatus.

2. Description of Related Art

Efforts have been made to develop an improved $5^{th}$ generation (5G) communication system or a pre-5G communication system in order to meet the demand for wireless data traffic having increased since the deployment of $4^{th}$ generation (4G) communication systems. Therefore, the 5G or pre-5G communication system may be referred to as a beyond 4G network or a post long term evolution (LTE) system. The 5G communication system is considered to be implemented in a band of 6 GHz or less (e.g., 1.8 GHz band or 3.5 GHz band) or extremely high frequency (mmWave) bands (e.g., 28 GHz band or 39 GHz band) so as to accomplish higher data rates. To decrease the propagation loss of radio waves and increase the transmission distance of radio waves, beamforming, massive multiple-input multiple-output (MIMO), full dimensional MIMO (FD-MIMO), array antenna, analog beamforming, large scale antenna techniques, and the like have been discussed in the 5G communication system. In addition, in the 5G communication system, development for system network improvement is under way based on an evolved small cell, an advanced small cell, a cloud radio access network (RAN), an ultra-dense network, device-to-device (D2D) communication, wireless backhaul, a moving network, cooperative communication, coordinated multi-point (CoMP), interference cancellation, and the like. In addition, in the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

Provided are a method and apparatus using a cross-carrier scheduling in a wireless communication system. Provided is a method for changing a bandwidth part using cross-carrier scheduling in a wireless communication system.

According to an aspect of the disclosure, a method performed by a terminal in a wireless communication system may include receiving configuration information for a secondary cell (SCell), identifying whether a carrier indicator field (CIF) presence field is included in the configuration information for the SCell, receiving downlink control information for at least one other cell through the SCell based on identifying that a CIF presence field is included in the configuration information for the SCell, and performing bandwidth part (BWP) switching for the at least one other cell based on the downlink control information.

The method may further include identifying whether a CIF presence field is included in configuration information for a primary cell (PCell), and, in response to identifying that a CIF presence field is not included in the configuration information for the PCell, performing a BWP switching for the PCell based on the downlink control information received through the SCell.

The method may further include starting a BWP deactivation timer based on the downlink control information, and reverting to a default BWP based on the BWP deactivation timer expiring.

The method may further include skipping a start of a deactivation timer for the SCell, where the downlink control information may include a common field including at least one of a downlink control information format indicator or a cyclic redundancy check (CRC), and a cell specific field including at least one of a carrier indicator, a BWP identification (BWP ID), and frequency resource allocation information.

According to an aspect of the disclosure, a method performed by a base station in a wireless communication system may include transmitting configuration information for an SCell, transmitting downlink control information for at least one other cell through the SCell based on a CIF presence field being included in configuration information for the SCell, and performing BWP switching for the at least one other cell based on the downlink control information.

The method may further include, based on a CIF presence field not being included in configuration information for a PCell, performing BWP switching for the PCell based on the downlink control information received through the SCell.

A BWP deactivation timer may start based on the downlink control information, and a BWP may revert to a default BWP based on the BWP deactivation timer expiring.

A start of a deactivation timer for the SCell may be skipped, where the downlink control information may include a common field including at least one of a downlink control information format indicator or a CRC, and a cell specific field including at least one of a carrier indicator, a BWP ID, and frequency resource allocation information.

According to an aspect of the disclosure, a terminal in a wireless communication system may include a transceiver, and a controller configured to receive, via the transceiver, configuration information for an SCell, identify whether a CIF presence field is included in the configuration information for the SCell, receive, via the transceiver, downlink control information for at least one other cell through the SCell based on identifying that a CIF presence field is included in the configuration information for the SCell, and perform BWP switching for the at least one other cell based on the downlink control information.

The controller may be further configured to identify whether a CIF presence field is included in configuration information for a PCell, and in response to identifying that a CIF presence field is not included in the configuration information for the PCell, perform the BWP switching for the PCell based on the downlink control information received through the SCell.

The controller may be further configured to start a BWP deactivation timer based on the downlink control information, and revert to a default BWP based on the BWP deactivation timer expiring.

The controller may be further configured to skip a start of a deactivation timer for the SCell, where the downlink control information may include a common field including at least one of a downlink control information format indicator or a CRC, and a cell specific field including at least one of a carrier indicator, a BWP ID, and frequency resource allocation information.

According to an aspect of the disclosure, a base station in a wireless communication system may include a transceiver, and a controller configured to transmit, via the transceiver, configuration information for an SCell, transmit, via the transceiver, downlink control information for at least one other cell through the SCell based on a CIF presence field being included in configuration information for the SCell, and perform BWP switching for the at least one other cell based on the downlink control information.

The controller may be further configured to identify whether a CIF presence field is included in configuration information for a PCell, in response to identifying that a CIF presence field is not included in the configuration information for the PCell, perform BWP switching for the PCell based on the downlink control information received through the SCell, start a BWP deactivation timer based on the downlink control information, and revert to a default BWP based on the BWP deactivation timer expiring.

A start of a deactivation time for the SCell may be skipped, where the downlink control information may include a common field including at least one of a downlink control information format indicator or a CRC, and a cell specific field including at least one of a carrier indicator, a BWP ID, and frequency resource allocation information.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
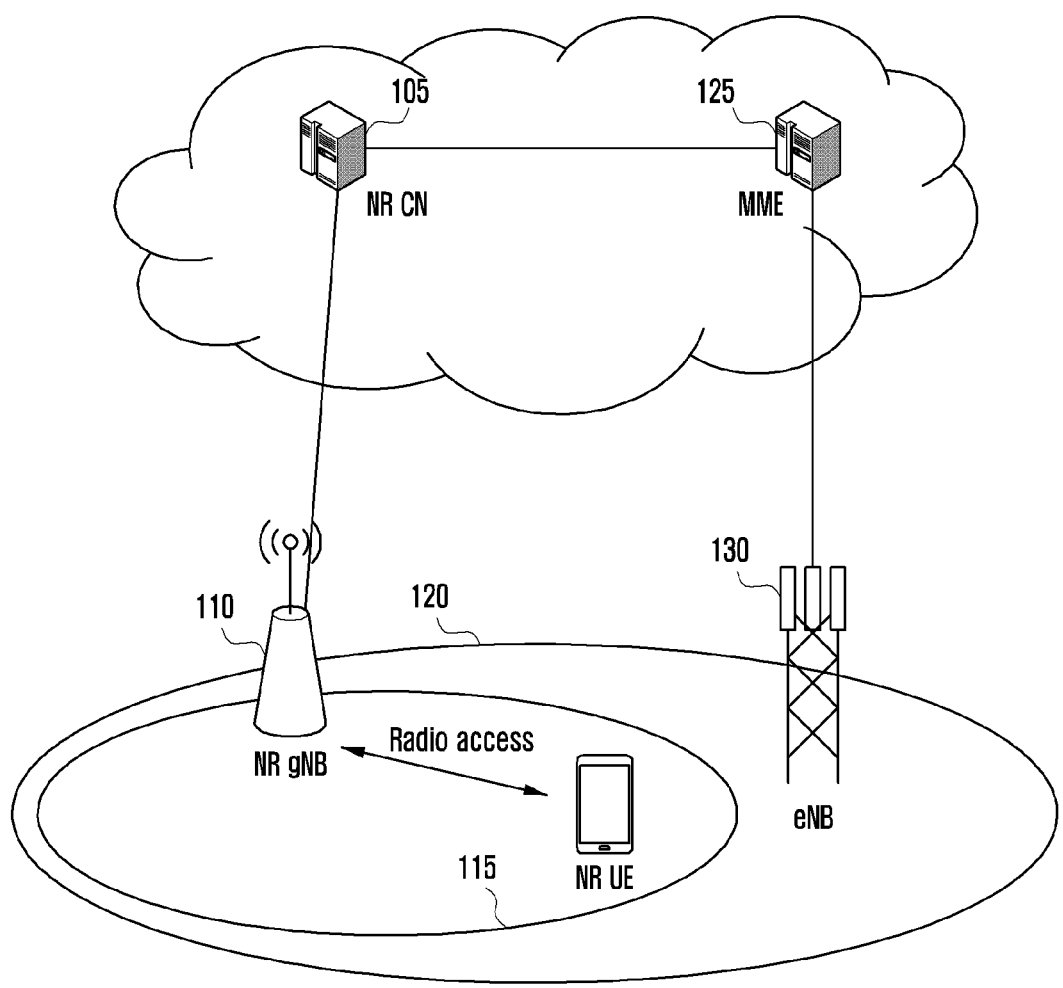
FIG. 1 is a diagram of a structure of a next-generation mobile communication system according to an embodiment of the disclosure.

Hereinafter, embodiments of the present disclosure will be described in detail with reference to the accompanying drawings.

In describing embodiments, descriptions of technical contents that are well known in the technical field to which the present disclosure pertains and are not directly related to the present disclosure will be omitted. This is to more clearly convey the gist of the present disclosure by omitting unnecessary description.

For the same reason, in the accompanying drawings, some components are enlarged, omitted, or depicted schematically. Furthermore, the size of each component does not accurately reflect its real size. In the drawings, the same or similar components are assigned the same reference numerals.

The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments of the present disclosure are provided to only complete the present disclosure and to allow those skilled in the art to understand the category of the present disclosure. The present disclosure is defined by the category of the claims. The same reference numerals will be used to refer to the same or similar components throughout the drawings.

In this case, it will be understood that each block of the flowchart illustrations and combinations of the flowchart illustrations may be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s). These computer program instructions may also be stored in computer-usable or computer-readable memory that may direct a computer or other programmable data processing equipment to function in a particular manner, so that the instructions stored in the computer-usable or computer-readable memory produce an article of manufacture including instruction means that implement the function specified in the flowchart block(s). The computer program instructions may also be loaded into a computer or other programmable data processing apparatus to cause a series of operational steps performed on the computer or other programmable data processing apparatus to produce a computer-executed process, so that the instructions performing the computer or other programmable data processing apparatus provide the steps for executing the functions described in the flowchart block(s).

Furthermore, each block may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit", as used in the present embodiment means software or a hardware component, such as a field programmable gate array (FPGA) or an application-specific integrated circuit (ASIC), and the "unit" performs specific tasks. However, the 'unit' is not limited to software or hardware. The "unit" may be constituted to reside on an addressable storage medium and constituted to operate on one or more processors. Accordingly, according to some embodiments, the "unit" may include components such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate one or more CPUs within a device or a security multimedia card. Also, according to some embodiments, the 'unit' may include one or more processors.

Hereinafter, the operating principles of the present disclosure are described in detail with reference to the accompanying drawings. In describing the present disclosure below, a detailed description of a related known function or configuration will be omitted if it is deemed to make the gist of the present disclosure unnecessarily vague. Furthermore, terms to be described hereunder have been defined by taking into consideration functions in the present disclosure, and may be different depending on a user, an operator's intention or practice. Accordingly, each term should be defined based on contents over the entire specification. Hereinafter, a base station is the subject of resource allocation to a terminal, and may be at least one of a gNode B, an eNode B, a Node B, a base station (BS), a radio access unit, a BS controller and a node in a network. A terminal may include a user equipment (UE), a mobile station (MS), a cellular phone, a smartphone, a computer and a multimedia system capable of performing a communication function. Apparently, it is not limited to the above example. Hereinafter, the present disclosure describes a technology for a terminal to receive broadcast information from a base station in a wireless communication system. The present disclosure relates to a communication technique which combines a 5th generation (5G) communication system, for supporting a higher data rate following 4th Generation (4G) systems, with Internet of Things (IoT) technology, and to a system for the communication technique. The present disclosure may be applied to intelligent services (for example, smart homes, smart buildings, smart cities, smart cars or connected cars, health care, digital education, retail business, security, and safety-related services), on the basis of 5G communication technology and IoT-related technology.

Terms referring to broadcast information, terms referring to control information, terms related to communication coverage, terms (e.g., an event) referring to a state change, terms referring to network entities, terms referring to messages, terms referring to components of a device, and the like which are used in the following description are illustrated for convenience of description. Therefore, the present disclosure is not limited to the following terms, and other terms having equivalent technical meanings may be used.

For convenience of description, some of terms and names defined in the 3rd generation partnership project long term evolution (3GPP LTE) standard may be used. However, the present disclosure is not limited by the above-mentioned terms and names, and may be equally applied to systems conforming to other standards.

According to the present disclosure, it is possible to efficiently use radio resources by proposing a method for changing a bandwidth using cross-carrier scheduling in a wireless communication system.

FIG. 1 is a diagram of a structure of a next-generation mobile communication system according to an embodiment of the disclosure.

With reference to FIG. 1, a radio access network of a next-generation mobile communication system (hereinafter, new radio (NR) or 5G) may be constituted with a next-generation base station (new radio node B, hereinafter NR gNB or NR base station) 110 and a new radio core network (NR CN) 105. A new radio user equipment (NR user equipment (UE) or terminal) 115 may access an external network through the NR gNB 110 and the NR CN 105.

In FIG. 1, the NR gNB 110 may correspond to an Evolved Node B (eNB) of an existing long-term evolution (LTE) system. The NR gNB is connected to the NR UE 115 through a radio channel, and may provide a service superior to that of the existing Node B. In the next-generation mobile communication system, all user traffics may be serviced through a shared channel. Therefore, an apparatus for scheduling by collecting status information such as buffer status, available transmission power status, and channel status of UEs is required, and the NR NB 110 may be responsible for this. One NR gNB may control multiple cells. In the next-generation mobile communication system, a bandwidth greater than or equal to a current maximum bandwidth may be applied to implement super speed data transmission compared to current LTE. In addition, a beamforming technology may be additionally combined by using orthogonal frequency division multiplexing (OFDM) as a radio access technology. In addition, an adaptive modulation & coding (hereinafter, referred to as AMC) scheme for determining a modulation scheme and a channel coding rate according to the channel state of the terminal may be applied.

The NR CN 105 may perform functions such as mobility support, bearer configuration, and QoS configuration. The NR CN is a device that performs various control functions, as well as a mobility management function for a terminal, and may be connected to a plurality of base stations. In addition, the next-generation mobile communication system may be interlocked with the existing LTE system, and the NR CN may be connected to the MME 125 through a network interface. The MME may be connected to an eNB 130, which is an existing base station.

Figure 2:
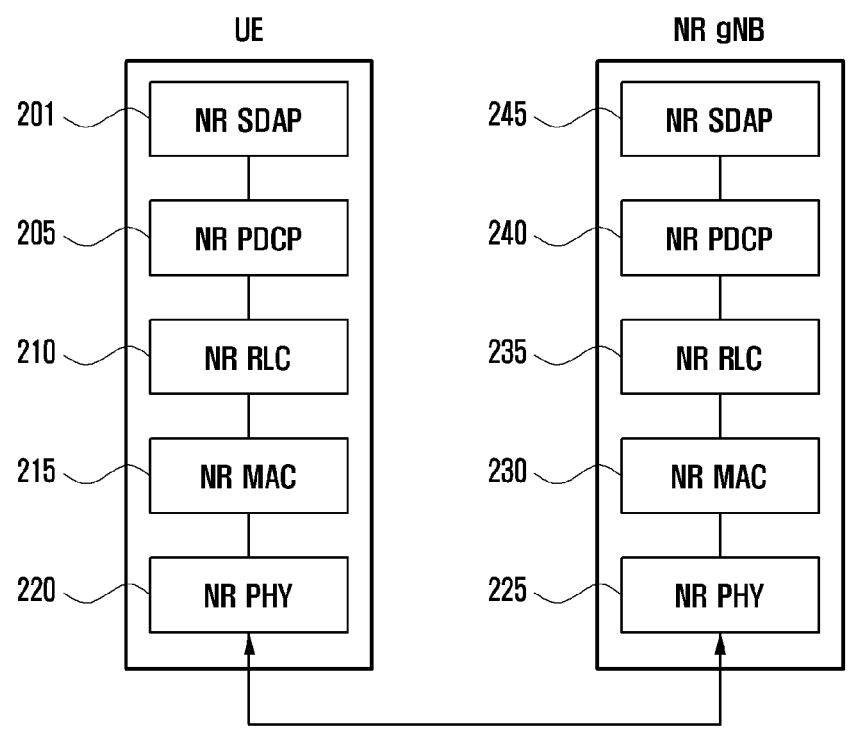
FIG. 2 is a diagram of a radio protocol structure of a next-generation mobile communication system according to an embodiment of the disclosure.

FIG. 2 is a diagram of a radio protocol structure of a next-generation mobile communication system according to an embodiment of the disclosure.

With reference to FIG. 2, the radio protocol of the next-generation mobile communication system includes NR service data adaptation protocol (SDAP) 201, 245, NR PDCP 205, 240, NR radio link control (RLC) 210, 235, NR MAC 215, 230, and NR PHY 220, 225 in a terminal and an NR base station, respectively.

The primary functions of the NR SDAP 201, 245 may include some of the following functions: a transfer function of user data (transfer of user plane data); a mapping function between QoS flow and data bearer for an uplink and a downlink (mapping between a QoS flow and a DRB for both DL and UL); a marking function of QoS flow ID in an uplink and a downlink (marking QoS flow ID in both DL and UL packets); and a mapping function of reflective QoS flow to data bearer for upper link SDAP PDUs (reflective QoS flow to DRB mapping for UL SDAP PDUs).

With regard to an SDAP layer entity, the terminal may receive a configuration indicating whether or not to use a header of the SDAP layer entity or whether or not to use functions of the SDAP layer entity for each PDCP layer entity, for each bearer, or for each logical channel through a radio resource control (RRC) message. In the case where the SDAP header is configured, a 1-bit non-access stratum (NAS) reflective quality-of-service (QoS) configuration indicator and 1-bit access stratum (AS) reflective QoS configuration indicator of the SDAP header may instruct the terminal to update or reconfigure mapping information between the QoS flow and the data bearers in uplink and downlink. The SDAP header may include QoS flow ID information indicating the QoS. The QoS information may be used as data processing priority, scheduling information, and the like in order to support effective services.

The primary functions of the NR PDCP 205, 240 may include some of the following functions; a function of header compression and decompression (ROHC only); a transfer function of user data; an in-sequence delivery function (in-sequence delivery of upper layer PDUs); out-of-sequence delivery function (out-of-sequence delivery of upper layer PDUs); a reordering function (PDCP PDU reordering for reception); a duplicate detection function (duplicate detection of lower layer SDUs); a retransmission function (retransmission of PDCP SDUs); ciphering and deciphering functions; and a timer-based SDU discard function (timer-based SDU discard in uplink).

The above reordering function of the NR PDCP entity may denote a function of reordering PDCP PDUs received from a lower layer, based on a PDCP sequence number (SN). The reordering function of the NR PDCP entity may include a function of transmitting data to a higher layer in the reordered order, may include a function of directly transmitting data to the higher upper layer without consideration of the order thereof, may include a function of reordering the sequence and recording lost PDCP PDUs, may include a function of sending a status report of the lost PDCP PDUs to a transmitting end, and may include a function of making a request for retransmission of the lost PDCP PDUs.

The primary functions of the NR RLC 210, 235 may include some of the following functions: a data transfer function (transfer of upper layer PDUs); an in-sequence delivery function (in-sequence delivery of upper layer PDUs); an out-of-sequence delivery function (out-of-sequence delivery of upper layer PDUs); an ARQ function (error correction through ARQ); a concatenation, segmentation and reassembly functions (concatenation, segmentation and reassembly of RLC SDUs); a re-segmentation function (re-segmentation of RLC data PDUs); a reordering function (reordering of RLC data PDUs); a duplicate detection function; an error detection function (protocol error detection); an RLC SDU discard function; and an RLC re-establishment function.

In the above description, the in-sequence delivery function of the NR RLC device may denote a function of transferring RLC SDUs received from a lower layer to a higher layer in sequence. The in-sequence delivery function of the NR RLC device may include a function of, if one original RLC SDU is divided into a plurality of RLC SDUs and received, reassembling and transmitting the same.

The in-sequence delivery function of the NR RLC device may include a function of reordering the received RLC PDUs, based on an RLC sequence number (SN) or a PDCP sequence number (SN), may include a function of reordering the sequence and recording lost RLC PDUs, may include a function of sending a status report of the lost RLC PDUs to a transmitting end, and may include a function of making a request for retransmission of the lost RLC PDUs.

The in-sequence delivery function of the NR RLC 210, 235 device may include a function of, if there is a lost RLC SDU, transmitting only the RLC SDUs prior to the lost RLC SDU to a higher layer in sequence. In addition, the in-sequence delivery function of the NR RLC device may include a function of, if a predetermined timer expires even though there is a lost RLC SDU, transmitting all RLC SDUs received before the timer starts to the higher layer in sequence. In addition, the in-sequence delivery function of the NR RLC device may include a function of, if a predetermined timer expires even though there is a lost RLC SDU, transmitting all RLC SDUs received until the present to the higher layer in sequence.

The NR RLC 210, 235 device may process the RLC PDUs in the order of reception, regardless of a serial number (out-of-sequence delivery), and may transmit the same to the NR PDCP 205, 240 device.

In the case of receiving segments, the NR RLC 210, 235 device may receive the segments, which are stored in a buffer or will be received later, may reconstitute the same into one complete RLC PDU, and may transmit the complete RLC PDU to the NR PDCP device.

The NR RLC layer may not include a concatenation function, which may be performed in the NR MAC layer or may be replaced with a multiplexing function of the NR MAC layer.

In the above description, the out-of-sequence delivery of the NR RLC device may denote a function of directly delivering RLC SDUs received from a lower layer to a higher layer regardless of the sequence thereof. The out-of-sequence delivery of the NR RLC device may include a function of, if one original RLC SDU is divided into a plurality of RLC SDUs and is received, reassembling and delivering the same. The out-of-sequence delivery of the NR RLC device may include a function of storing and ordering RLC SNs or PDCP SNs of the received RLC PDUs, thereby recording the lost RLC PDUs.

The NR MAC 215, 230 may be connected to a plurality of NR RLC layer devices constituted in a single terminal, and the primary functions of the NR MAC may include some of the following functions: a mapping function (Mapping between logical channels and transport channels); multiplexing and demultiplexing functions (Multiplexing/demultiplexing of MAC SDUs); a scheduling information reporting function; a HARQ function (Error correction through HARQ); a priority handling function between logical channels (priority handling between logical channels of one UE); a priority handling function between UEs (priority handling between UEs by means of dynamic scheduling); an MBMS service identification function; a transport format selection function; and a padding function.

The NR PHY layer 220, 225 may perform operations of channel-coding and modulating the higher layer data into an OFDM symbol and transmitting the same through a radio channel, or operations of demodulating and channel-decoding the OFDM symbol received through the radio channel and transmitting the same to the higher layer.

Figure 3:
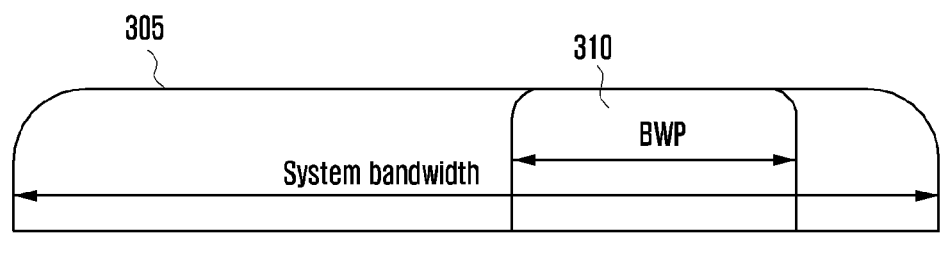
FIG. 3 is a diagram of scenarios of applying a bandwidth part in a wireless communication system according to an embodiment of the disclosure.
Figure 3:
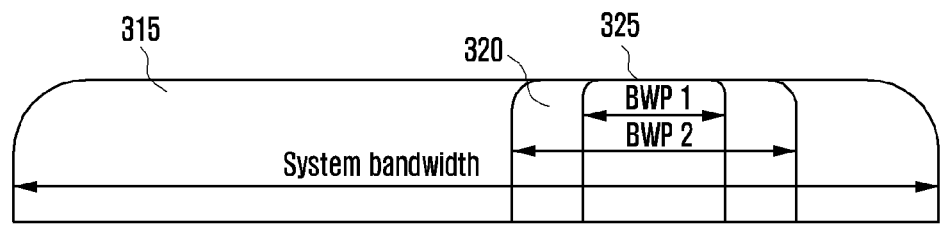
Figure 3:
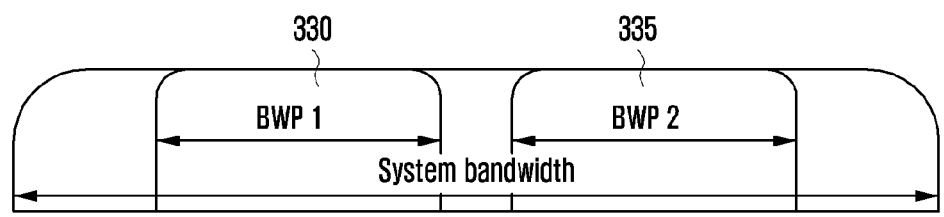

FIG. 3 is a diagram of scenarios of applying a bandwidth part in a wireless communication system according to an embodiment of the disclosure.

A bandwidth part (BWP) application technology refers to communication performed by a single UE by using only a part frequency bandwidth of a system bandwidths used by a single cell. The BWP may be used for the purpose of reducing UE manufacturing costs or saving power consumed by the UE. The BWP may be configured by a base station only for a UE supporting the BWP.

With reference to FIG. 3, there may be largely three types of BWP operating scenarios.

A first scenario may apply a BWP for the UE supporting only a small frequency bandwidth 310 that is less than a system bandwidth 305 used by a cell. A specific UE may support only a limited bandwidth. This UE may report to the base station that only a limited bandwidth is supported, and thus the base station may configure a BWP equal to or less than the maximum bandwidth supported by the UE.

A second scenario may apply a BWP for UE power saving. For example, although the UE may perform communication by using a whole system bandwidth 315 used by a cell or by using a BWP 320 thereof, the base station may configure a smaller BWP 325 for power saving.

A third scenario may apply an individual BWP corresponding to each different numerology. Numerology is used to diversify physical entity configuration for optimal data transmission based on various service requirements. For example, in an orthogonal frequency-division multiple access (OFDMA) structure including multiple subcarriers, subcarrier spacing may be variably adjusted based on a certain requirement. One UE may perform communication by simultaneously using multiple numerologies. In this case, because physical entity configurations corresponding to the respective numerologies differ, individual BWPs 330, 335 may be configured to correspond to different numerologies.

Accordingly, when the UE performs the above-described random access and a random access preamble is transmitted via a UL BWP, it may be ambiguous as to through which DL BWP an RAR response is to be received by the UE when there are multiple DL BWPs. In order to remove such ambiguity, a linkage between the DL BWP and the UL BWP may be defined. For example, when the UE transmitted a preamble to a UL BWP of a serving cell within the serving cell (e.g., PCell), the above ambiguity may disappear when an RAR response is received via a DL BWP of the serving cell (e.g., PCell). For example, when one serving cell (e.g., PCell) operates in TDD, the DL BWP and the UL BWP may exist in the same frequency band, and when the preamble is transmitted to the UL BWP of the serving cell, if the RAR response is received in the DL BWP of the corresponding serving cell (e.g., PCell), the above-mentioned ambiguity may disappear.

On the other hand, in NR, there may be a plurality of BWPs for DL and UL in one serving cell, respectively, and since supportable bandwidths for each UL are different, in the initial access, communication must be performed with an initial BWP applicable to all terminals, and the BWP for a specific terminal may be applied from a predetermined time point.

The BWP may be changed through specific signaling (e.g., DCI transmitted through PDCCH), and the BWP to be applied to a target cell during handover may be indicated to the UE through specific signaling.

In addition, a BWP timer for specifying use of a specific BWP for the UE may be present and the BWP timer value may be transmitted to RRC signaling. When an activated BWP is no longer used until the timer is expired, the use of the configured BWP is stopped and the BWP may fall back or revert to an initially configured default BWP. The BWP switching operation using the BWP timer may be configured by the base station to fallback to an appropriate BWP and to save battery power of the UE.

Figure 4:
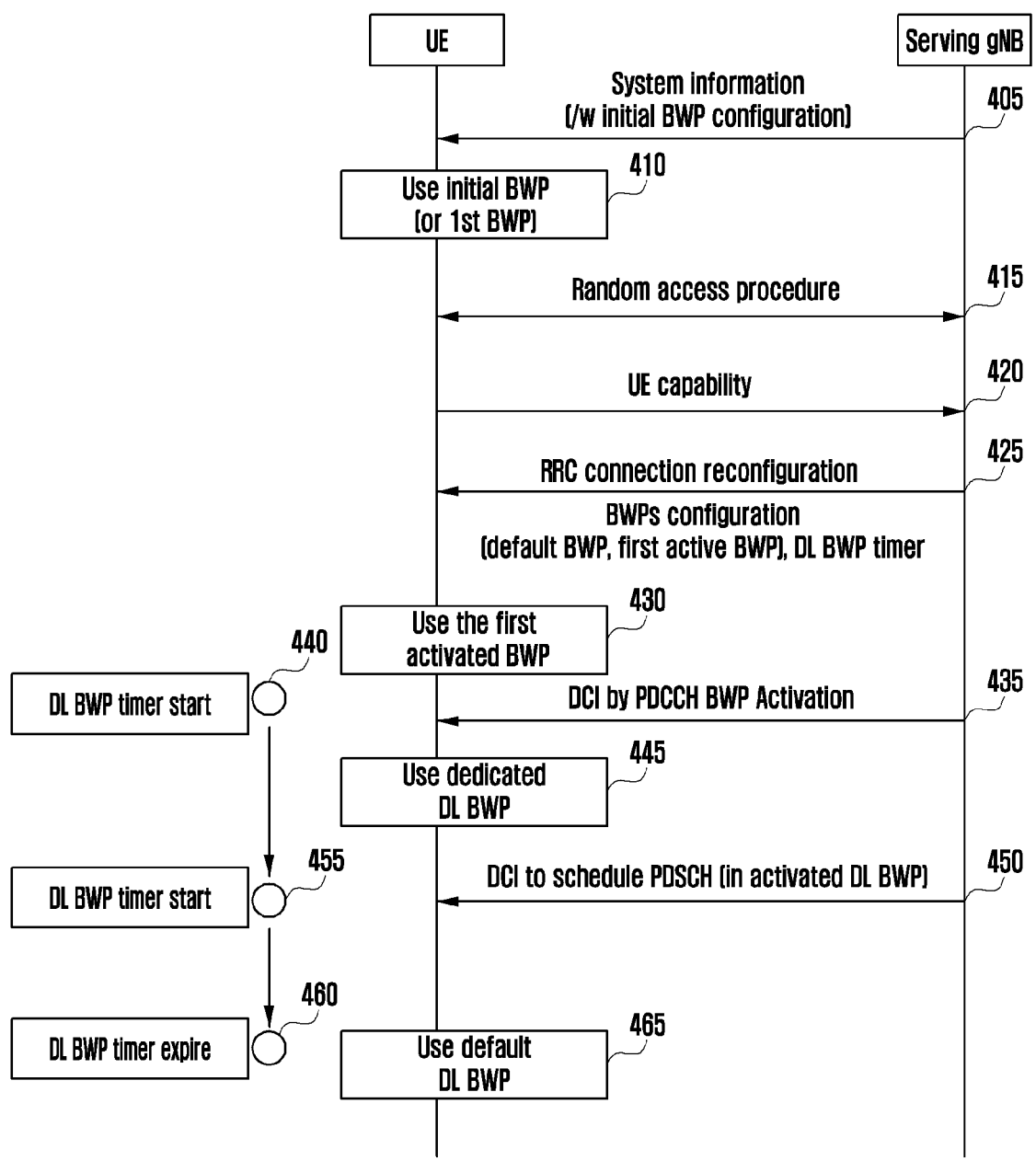
FIG. 4 is a diagram of a change operation of a bandwidth part (BWP) in a wireless communication system according to an embodiment of the disclosure.

FIG. 4 is a diagram of a change operation of a bandwidth part (BWP) in a wireless communication system according to an embodiment of the disclosure.

A UE may receive at least one system information broadcasted by a base station at a specific frequency location 405. The at least one system information may be periodically broadcasted at a preset radio resource location and may include essential information required to camp on or initially access the cell.

In the present disclosure, the at least one system information may include configuration information of a first BWP used for initial access. The first BWP may be defined as an initial BWP. The BWP configuration information may include at least one of center frequency, frequency bandwidth information, or random access radio resource information.

In this case, the center frequency and the bandwidth information may be configured separately for a UL and a DL. The random access radio resource needs to be within at least the frequency bandwidth. The frequency bandwidth information may be provided as the number of PRBs or in units of hertz (Hz). As another example, the UE may identify the DL configuration information of the first BWP based on at least a part included in the at least one system information. In this case, the at least one system information does not need to additionally include the configuration information of the first BWP but may include at least one of UL frequency information or random access radio resource information.

The UE uses the first BWP 410 to perform a subsequent procedure. The subsequent procedure may include a random access procedure and a reception procedure of a certain control message.

The random access procedure 415 may include at least one of transmitting a preamble for random access to the base station by the UE, transmitting a random access response (RAR) message to the UE by the base station, transmitting a msg3 message to the base station by the UE, or transmitting a msg4 message to the UE by the base station.

The UE may transmit the preamble by using the random access radio resource indicated by the at least one system information. During a certain period after the preamble is transmitted, the UE may monitor whether a RAR message corresponding to the preamble is received. When the RAR message is successfully received, the UE may transmit the msg3 message by using a radio resource indicated by the RAR message. Within a certain time, the UE may receive the msg4 and may determine whether ultimately attempted random access succeeds. All radio resources used to transmit and receive the above-mentioned messages may be within at least the first BWP.

During random access or immediately after random access succeeds, the UE may report UE capability information to the base station by still using the first BWP 420. The UE capability information may include information about the maximum bandwidth supported by the UE.

In addition, an electronics may receive a certain RRC message from the base station by using the first BWP 425. The RRC message may include a list of a plurality of BWPs supported by a corresponding serving cell, BWP timer information valid in a corresponding serving cell, and the like, and the BWP configuration included in the corresponding list may include at least one of BWP index or specific BWP configuration information.

That is, the base station may indicate the BWP information including a center frequency and frequency bandwidth information for each of BWPs supported by the corresponding serving cell, separately for a UL and a DL by using the RRC message. The frequency bandwidth may not exceed the maximum frequency bandwidth included in the UE capability information.

The base station may also include in the RRC message the indicators of a second BWP and a third BWP among the BWPs included in the BWP list. The second BWP is defined as a base BWP or a default BWP and may be a fallback BWP to which the UE returns and operates when a BWP timer expires during operation using another BWP in the corresponding serving cell. Also, the third BWP may refer to a first activated BWP among the plurality of BWPs by the base station through RRC configuration. According to one embodiment, the second BWP and the third BWP may be configured as the same BWP or different BWPs. According to one embodiment, the first BWP and the second BWP may be configured as the same BWP or different BWPs. According to one embodiment, the first BWP and the third BWP may be configured as the same BWP or different BWPs.

According to various embodiment, when the UE supports multiple numerologies and the base station desires to configure a BWP per numerology, the RRC message may include numerology configuration information of a plurality of BWPs. The BWPs may maintain the same bandwidth while shifting a center frequency by a certain time interval based on a certain pattern. Such a technology is called frequency hopping, and pattern information and execution information may be included in the configuration information. An indicator for activating the configured DL and UL BWPs may be included in the control message, or downlink control information (DCI) of a physical downlink control channel (PDCCH) or MAC control element (MAC CE) may include a control message for triggering activation of a corresponding BWP.

In operation 430, the UE performs communication by using the DL and UL third BWPs (i.e., initial activated BWP, first activated BWP) indicated by the base station. In operation 435, the UE receives a PDCCH indicating the activation of a specific BWP (DCI indicates index information of the BWP to be activated) or MAC CE, and then may start the DL BWP timer valid in the corresponding cell 440 and may switch to the configured BWP 445

The DL BWP timer is to define how long the UE uses the indicated activated DL BWP. When DCI indicating the PDSCH resource for DL data transmission is received through the PDCCH 450, the DL BWP timer may restart 455.

When the BWP timer expires, the UE may fall back to the second BWP (i.e., a default BWP) configured by the base station 460, 465. This means that the configured DL BWP is deactivated when data transmission and reception is no longer actively performed using the configured DL BWP. Otherwise, deactivation may be explicitly indicated using DCI indicating the corresponding BWP index, and activation of another BWP or default BWP may be indicated. In the case of the uplink (UL) BWP, when the UL BWP is paired with the downlink (DL) BWP (e.g., time-division duplex (TDD)), the UL BWP operates based on the DL BWP timer. That is, after the timer expires, the UL BWP falls back to the default BWP to perform communication. When the UL BWP is unpaired with the DL BWP (e.g., frequency-division duplex (FDD)), one of the methods of explicit indication of activation/deactivation of the UL BWP through the PDCCH, configuration of an independent BWP timer, and fallback to the default UL BWP along with expiration of the DL BWP may be used.

Figure 5:
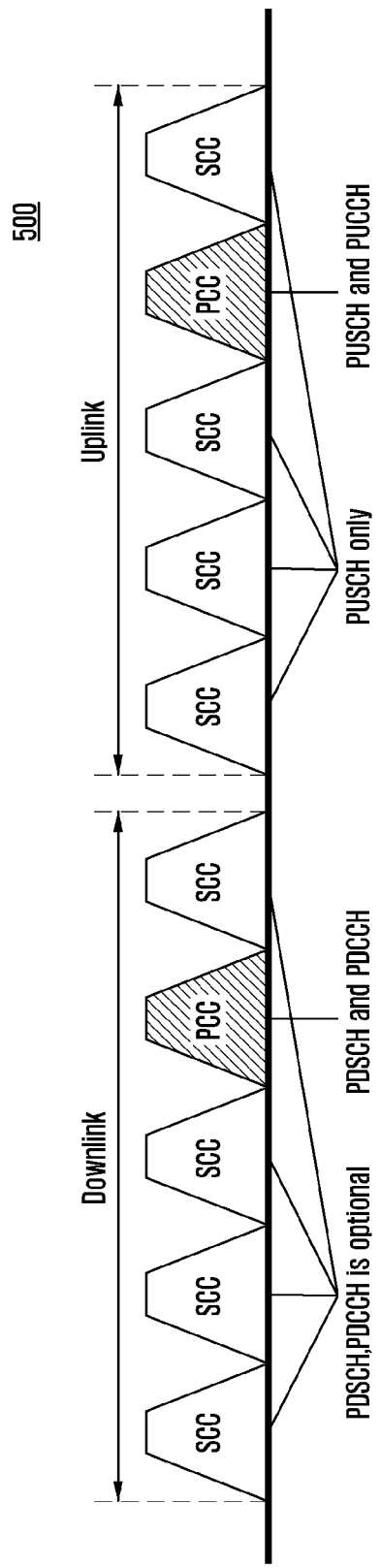
FIG. 5 is a diagram for describing carrier aggregation (CA) according to an embodiment of the disclosure.

FIG. 5 is a diagram for describing carrier aggregation (CA) according to an embodiment of the disclosure.

With reference to FIG. 5, when CA is constituted 500, a cell (one CA) may be constituted with a primary cell (PCell) and a secondary cell (SCell). The PCell is included in a primary component carrier (PCC), and may provide functions of RRC connection establishment/re-establishment, measurement, mobility procedure, random access procedure and selection, system information acquisition, initial random access, security key change and Non-Access Stratum (NAS), and the like. The PCell is not deactivated because it performs system information monitoring, and the PCC in the UL is delivered through the PUCCH for transmission of control information. In addition, only one RRC connection is possible, and PDCCH/PDSCH/PUSCH/PUCCH transmission is possible. In addition, in the secondary cell group, the PSCell may be configured and operated as the PCell. The operation for the PCell described below may also be performed by the PSCell.

A maximum of 4 SCells may be added, and if additional radio resource provision is required, the SCell may be configured through a RRC message (e.g., dedicated signaling). The RRC message may include a physical cell ID for each cell, and may include a DL carrier frequency (absolute radio frequency channel number (ARFCN)). PDCCH/PDSCH/PUSCH transmission is possible through the SCell. The dynamic activation and deactivation procedures of the SCell is provided for battery conservation of the UE through the MAC layer.

Cross-carrier scheduling may refer to allocating at least one of all L1 control channels and L2 control channels, such as PDCCH, for at least one other component carrier (CC) to one component carrier (CC). In order for the PDCCH of one CC to transmit data information of another CC, a carrier indicator field (CIF) may be used that cross-carrier scheduling may be applied. Through the control information transmitted from PDCCH of one CC, the resource for data transmission such as PDSCH, PUSCH of the CC or the resource for data transmission such as PDSCH, PUSCH of another CC may be allocated. 3-bit CIF is added to a DCI format by applying cross-carrier scheduling, and the bit size is always fixed, and the DCI format size may also be fixed regardless of the location.

Figure 6:
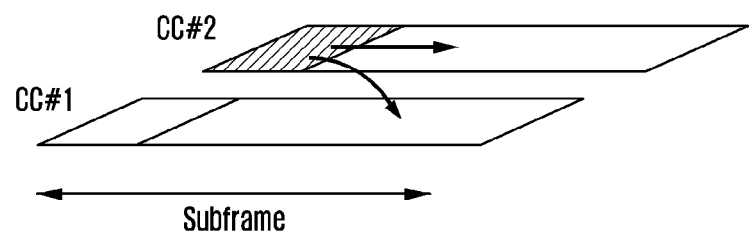
FIG. 6 is a diagram illustrating an example of a cross-carrier scheduling method according to an embodiment of the disclosure.
Figure 6:
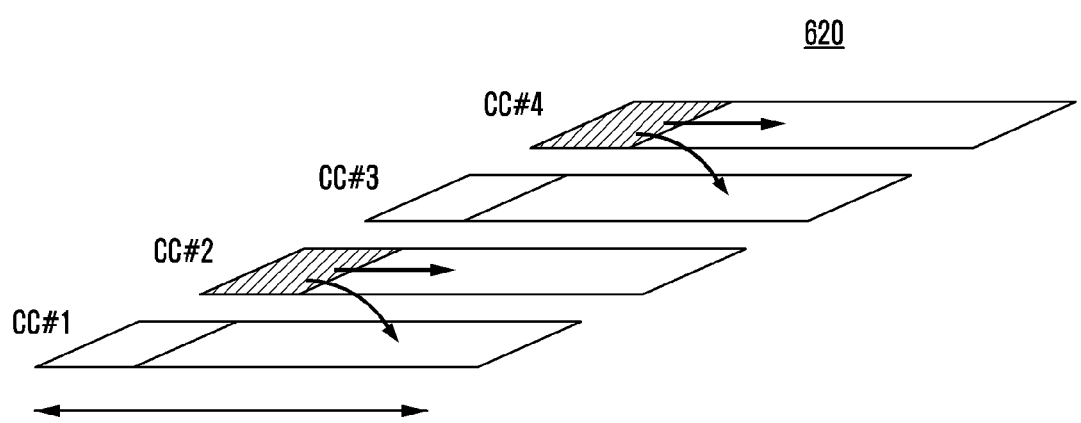

FIG. 6 is a diagram illustrating an example of a cross-carrier scheduling method according to an embodiment of the disclosure.

With reference to 610 of FIG. 6, the PDCCH of one CC may serve the PDSCH and PUSCH of two CCs, which is the most basic form. In addition, with reference to 620, if a total of four CCs is configured, the PDSCH and PUSCH of each CC may be served using the PDCCH of two CCs.

Each CC may be mapped to a carrier indicator CI value for CIF application, which may be transmitted from the base station to the UE through a dedicated RRC signal with UE-specific configuration.

After RRC reconfiguration including CI mapping information, at least one carrier may always be activated.

Each PDSCH/PUSCH CC may be scheduled from one DL CC. That is, the UE needs to monitor the PDCCH only in the DL CC for each PDSCH/PUSCH CC.

The UE may monitor the PDCCH in the DL CC to obtain PUSCH scheduling information in the linked UL carrier, as in Table 1.

TABLE 1

Example of Method 1

| CIF | Number of Available CCs | | | |
|---|---|---|---|---|
| | 2 | 3 | 4 | 5 |
| 000 | CC0, CFI = N | CC0, CFI = N | CC0, CFI = N | CC0, CFI = N |
| 001 | CC1, CFI = 1 | CC1, CFI = 1 | CC1, CFI = 1 | CC1, CFI = 1 |
| 010 | CC1, CFI = 2 | CC1, CFI = 2 | CC1, CFI = 2 | CC1, CFI = 2 |
| 011 | CC1, CFI = 3 | CC1, CFI = 3 | CC1, CFI = 3 | CC1, CFI = 3 |
| 100 | N/A | CC2, CFI = 1 | CC2, CFI = 1 | CC2, CFI = 3 |
| 101 | N/A | CC2, CFI = 2 | CC2, CFI = 2 | N/A |
| 110 | N/A | CC2, CFI = 3 | CC2, CFI = 3 | CC4, CFI = N |
| 111 | N/A | N/A | CC3, CFI = N | CC3, CFI = N |

In order to transmit carrier aggregation configuration information including the CFI value to the UE, the base station may use RRC signaling. The serving cell index ("CCn" (n=0, 1, 2, 3, 4)) included in the RRC signaling indicates a CC index value of a position to which the PDSCH is mapped. Also, "CFI=N" may refer to a CFI value transmitted through the RRC signaling. In order to avoid the error of the CFI value in which the number of available CCs is changed, the number of consecutively available CCs may configure the estimation of the CFI value that is changed within the maximum range.

Figure 7:
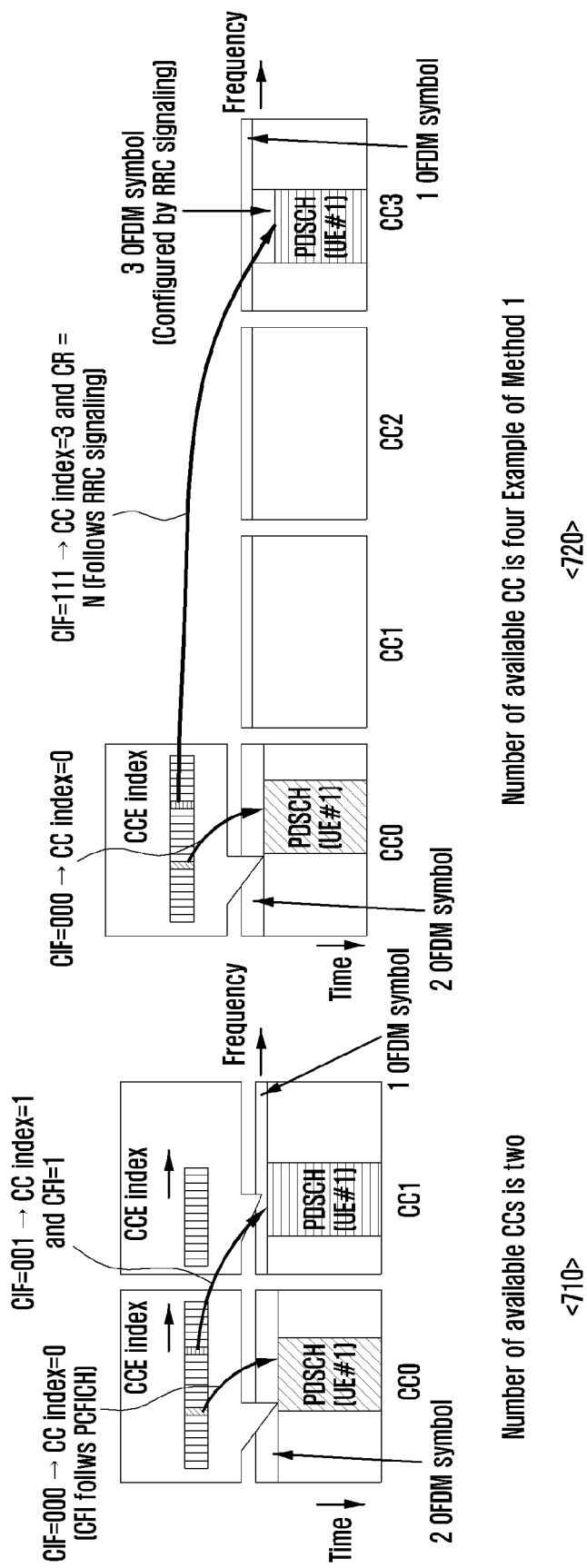
FIG. 7 is a diagram illustrating a specific example of a method of using cross-carrier scheduling according to an embodiment of the disclosure.

FIG. 7 is a diagram illustrating a specific example of a method of using cross-carrier scheduling according to an embodiment of the disclosure.

With reference to FIG. 7, an exemplary case where the number of available CCs is 2 is illustrated. In 710 in FIG. 7, when CIF indicates 000, CCI may refer to 0, and when CIF indicates 001, CCI may refer to 1.

In addition, 720 in FIG. 7 illustrates another example when the number of available CCs is 4, and CIF 000 may indicate CCI 0. In CC0, CFI includes PCFICH. Further, CIF 111 indicates CCI 3, which is controlled by a semi-static control signal by RRC signaling.

Figure 8:
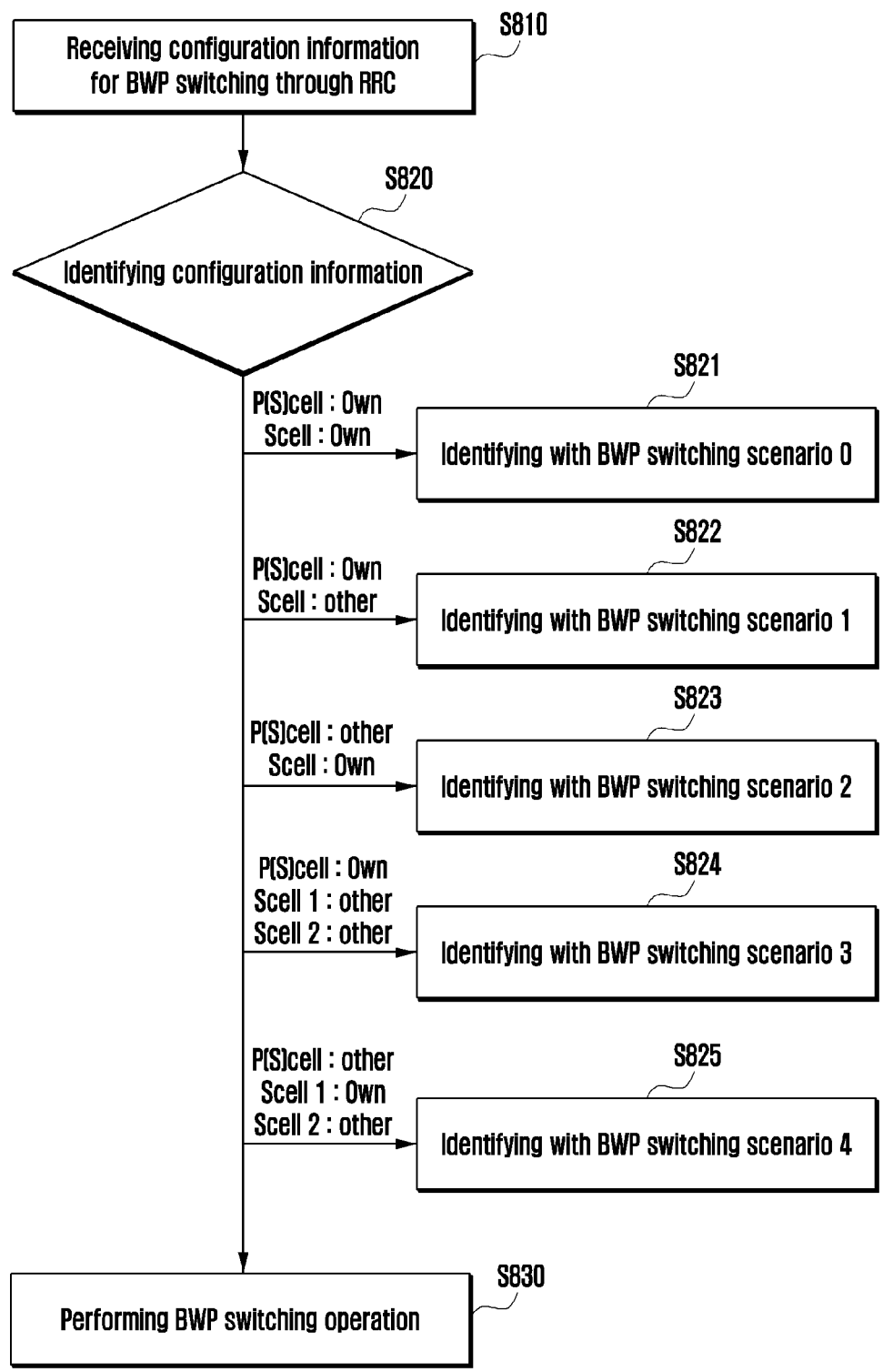
FIG. 8 is a diagram illustrating a BWP switching method using cross-carrier scheduling according to an embodiment of the disclosure.

FIG. 8 is a diagram illustrating a BWP switching method using cross-carrier scheduling according to an embodiment of the disclosure.

With reference to FIG. 8, the UE may receive configuration information for BWP switching in operation S810. The configuration information may be received through RRC signaling. The configuration information for BWP switching may be transmitted while being included in the configuration information for cross-carrier scheduling, or may be constituted as separate information. Therefore, in the present disclosure, the configuration information for BWP switching may be referred to as the configuration information for cross-carrier scheduling.

For the BWP switching, at least a part of information included in the cross scheduling configuration may be used. According to various embodiments, new signaling including configuration information for BWP switching may be defined. Specifically, the scenario in which BWP switching may occur is summarized in more detail as follows. The present disclosure provides a method of performing cross-carrier scheduling using DCI transmitted through a SCell.

TABLE 2

| Scenario | Description |
|---|---|
| BWP switching Scenario 0 | BWP switching control of a specific serving cell with DCI 1_0 or DCI 1_1 of the serving cell |
| BWP switching Scenario 1 | BWP switching control of a specific SCell with DCI 1_1 of P(S)Cell cells included in the same Cell Group |
| BWP switching Scenario 2 | BWP switching control of a P(S)Cell with DCI 1_1 of a SCell included in the same Cell Group |
| BWP switching Scenario 3 | BWP switching control of multiple serving cells included in the same Cell Group with DCI 1_2 transmitted from a PCell |
| BWP switching Scenario 4 | BWP switching control of multiple serving cells included in the same Cell Group with DCI 1_2 transmitted from a SCell |

For the operation of the above BWP switching scenarios, the base station may need information about the scenario supported by the UE. Accordingly, the UE may need to report the base station of the supported BWP switching scenario. If the UE reports the capability for the BWP switching scenario, the information included in the UE capability information may include at least one of information about a scenario supported by the UE or information related to SCS. For example, the UE capability information may include the following information.

Example 1: Whether to support BWP switching scenario 1, 2 bits: whether to support between the same SCSs, 1 bit, whether to support between different SCSs, 1 bit; whether to support BWP switching scenario 2, 2 bits: whether to support between the same SCSs, 1 bit, whether to support between different SCSs, 1 bit; whether to support BWP switching scenario 3, 2 bits: whether to support between the same SCSs, 1 bit, whether to support between different SCSs, 1 bit; whether to support BWP switching scenario 4, 2 bits: whether to support between the same SCSs, 1 bit, and whether to support between different SCSs, 1 bit.

Example 2: BWP switching scenario capable for supporting the same SCSs: 3-bit bit map; and BWP switching scenario capable for supporting between different SCSs: 3-bit bit map.

Example 3: BWP switching scenario supported by UE: 3-bit bitmap or 2-bit signaling.

The RRC message may include the following configuration information for BWP switching.

Example 1: CrossCarrierBWPswitchingConfig per serving cell.

For example, BwpSwitchingConfig is configured for each serving cell.

According to various embodiments, BwpSwitchingConfig may be configured for each BWP.

In addition, sCellDeactivationTimer may be configured for each BWP or for each cell (sCellDeactivationTimer per BWP, sCellDeactivationTimer per BWP serving cell).

In addition, according to various embodiments, a separate configuration parameter including configuration information for BWP switching may be added. Some of the following parameters may not be included in the configuration information for BWP switching, as in Table 3.

TABLE 3

```
CrossCarrierBwpSwitchingConfig ::=        SEQUENCE {
    BwpSwitchingCellInfo                  CHOICE {
        own                               SEQUENCE { -- Cross
carrier BwpSwitching scheduling cell
            cif-Presence                  BOOLEAN,
        },
        other                             SEQUENCE { -- Cross
carrier BwpSwitching scheduled cell
            BwpSwitchingCellId            ServCellIndex,
            cif-InBwpSwitchingCell        INTEGER (1..7)
        }
    },
    ...
}
]
```

Example 2: The field description of existing CrossCarrierSchedulingConfig may be modified and used.

As an example, cif-InSchedulingCell may be a CIF value of a cell including DCI capable of indicating BWP switching. As an example, schedulingCellId may be an ID value of a cell including DCI capable of indicating BWP switching. As an example, the cell indicated by the schedulingCellId may be an SCell. As an example, a cell transmitting the configuration information including at least one of schedulingCellId or cif-InSchedulingCell may be a PCell (or a PSCell), as in Table 4 and Table 5.

TABLE 4

```
CrossCarrierScheduling Config ::=         SEQUENCE {
    schedulingCellInfo                    CHOICE {
        own                               SEQUENCE { --
Cross carrier scheduling: scheduling cell
            cif-Presence                  BOOLEAN
        },
        other                             SEQUENCE { --
Cross carrier scheduling: scheduled cell
            schedulingCellId              ServCellIndex,
            cif-InSchedulingCell          INTEGER (1..7)
        }
    },
    ...
}
```

TABLE 5

CrossCarrierSchedulingConfig field descriptions cif-Presence
 The field is used to indicate whether carrier indicator field is present (value true) or not (value false) in PDCCH DCI formats, see TS 38.213 [13]. If cif-Presence is set to true, the CIF value indicating a grant or assignment for this cell is 0.
  cif-InSchedulingCell
   The field indicates the CIF value used in the scheduling cell to indicate a grant, assignment or BWP switching applicable for this cell, see TS 38.213 [13].
   other
   Parameters for cross-carrier scheduling, i.e., a serving cell is scheduled by a PDCCH on another (scheduling) cell. The network configures this field only for SCells.
    own
    Parameters for self-scheduling, i.e., a serving cell is scheduled by its own PDCCH.
    schedulingCellId
    Indicates which cell signals the downlink allocations, uplink grants and BWP switching, if applicable, for the concerned serving cell. In case the UE is configured with DC, the scheduling cell is part of the same cell group (i.e. MCG or SCG) as the scheduled cell.

The UE may identify configuration information for BWP switching in operation S820. Alternatively, the UE may identify configuration information for cross-carrier scheduling in S820.

The UE may identify the BWP switching method based on the configuration information for BWP switching. The BWP switching method may indicate any one of the above-described scenarios. Alternatively, the BWP switching method may indicate a method in which BWP switching of another cell is performed based on the DCI received through a SCell (BWP switching scenarios 1 and 3) or a method in which BWP switching of another cell is performed based on the DCI received through a PCell (BWP switching scenarios 2, 4).

Accordingly, operation S820 may be changed to a step of identifying whether BWP switching of another cell is performed based on the DCI received through the SCell. Alternatively, the method of performing BWP switching of another cell based on the DCI received through the SCell may refer to a case where configuration information for BWP switching for a SCell or configuration information for cross-carrier scheduling is configured as an own field (or a specific field), as will be described later. Alternatively, the case in which the own field is configured may refer to a case in which a CIF is present. Accordingly, operation S820 may be changed to a process of identifying whether the CIF presence is included in the configuration information for the SCell.

For example, the UE may identify the BWP switching method according to the field constitution included in the configuration information for BWP switching, and the following methods may be used.

When the configuration information for BWP switching received by the UE includes the following combination of information, the UE may determine that the method is BWP switching scenario 0 (operation S821). In this example, when configuration information for BWP switching for a PCell includes at least one or more of parameters included in an own field and configuration information for BWP switching for a SCell includes at least one or more of parameters included in an own field.

When the configuration information for BWP switching received by the UE includes the following combination of information, the UE may determine that the method is the BWP switching scenario 1 (operation S822). In this example, when configuration information for BWP switching for a PCell includes at least one or more of parameters included in an own field, the system may use configuration of DCI 1_1 in SearchSpaceConfig, or there may be no configuration to use of DCI 1_2 in SearchSpaceConfig.

However, the DCI format and specific DCI formats to be described later are only examples for configuring an example of the present disclosure, and a method using another DCI format may also be considered. In this example, when configuration information for BWP switching for a SCell includes at least one or more of parameters included in another field. CrossCarrierBwpSwitchingConfig or CrossCarrierSchedulingConfig is included in configuration information for a SCell.

In addition, when the configuration information for BWP switching received by the UE includes the following combination of information, the UE may determine that the method is the BWP switching scenario 2 (operation S823). In this example, when configuration information for BWP switching for a PCell includes at least one or more of parameters included in another field. CrossCarrierBwpSwitchingConfig or CrossCarrierSchedulingConfig is included in the configuration information for PCell.

When configuration information for BWP switching for a SCell includes at least one or more of parameters included in an own field, the system may use DCI 1_1 in SearchSpaceConfig or there is no configuration to use of DCI 1_2 in SearchSpaceConfig.

In addition, when the configuration information for BWP switching received by the UE includes the following combination of information, the UE may determine that the method is the BWP switching scenario 3 (operation S824). The difference between the BWP switching scenario 3 and the BWP switching scenario 1 is that, in the case of BWP switching scenario 3, the configuration information for BWP switching for at least one PCell includes at least one or more of the parameters included in an own field, and the configuration information for BWP switching for at least one or more SCells includes at least one or more of parameters included in another field. That is, in the case of scenario 3, the configuration information for BWP switching may include at least one of the following information. When configuration information for BWP switching for a PCell includes at least one or more of parameters included in an own field, the system may use DCI 1_2 in SearchSpaceConfig.

When configuration information for BWP switching for a SCell 1 includes at least one or more of parameters included in another field, CrossCarrierBwpSwitchingConfig or CrossCarrierSchedulingConfig is included in the configuration information for a SCell 1, and a PCell ID is configured in schedulingCellId.

When configuration information for BWP switching for a SCell 2 includes at least one or more of parameters included in another field, CrossCarrierBwpSwitchingConfig is included in the configuration information for a SCell 2, and a PCell ID is configured in schedulingCellId.

In addition, when the configuration information for BWP switching received by the UE includes the following combination of information, the UE may determine that a method is the BWP switching scenario 4 (operation S825). The difference between the BWP switching scenario 4 and the BWP switching scenario 2 is that in the case of BWP switching scenario 4, the configuration information for BWP switching for at least one S Cell includes at least one or more of parameters included in an own field, and the configuration information for BWP switching for at least one or more SCells includes at least one or more of parameters included in another field. That is, in the case of scenario 4, configuration information for BWP switching.

When configuration information for BWP switching for a PCell includes at least one or more of parameters included in another field, CrossCarrierBwpSwitchingConfig or CrossCarrierSchedulingConfig is included in the configuration information for a PCell, and a SCell 1 ID is configured in schedulingCellId.

When configuration information for BWP switching for a SCell 1 includes at least one or more of parameters included in an own field, the system may use DCI 1_2 in SearchSpaceConfig.

When configuration information for BWP switching for a SCell 2 includes at least one or more of parameters included in another field, CrossCarrierBwpSwitchingConfig is included in the configuration information of a SCell 2, and a SCell 1 ID is configured in schedulingCellId.

The UE, which has identified the BWP switching method through the above method, may perform the BWP switching operation in operation S830.

As described above, the BWP switching operation by the UE may include an operation of receiving DCI including BWP switching information, and transmitting and receiving data in the changed BWP based the received DCI.

For example, according to the BWP switching scenarios 2 and 4 (that is, the configuration information for a SCell includes an own field or a CIF presence field), DCI for another cell is received through the SCell, and based on this, the BWP switching for the other cell may be performed.

Hereinafter, a BWP switching operation according to the BWP switching scenario will be described in detail.

According to the BWP switching scenario 0, an individual serving cell may control BWP switching of the serving cell. The UE may receive the DCI having DCI type 1_1 from each serving cell.

Then, the UE may perform the BWP switching of the serving cell in which the DCI is received. Specifically, the DCI may include information indicating the BWP for BWP switching, and the UE may transmit and receive data by switching to the corresponding BWP. if the serving cell is a FDD cell, DL BWP switching may be performed, and if the serving cell is a TDD cell, DL BWP and UL BWP may be switched together.

Then, the UE may start or restart bwp-InactivityTimer of the serving cell that has received the DCI, and if the serving cell that has received the DCI is a SCell, the UE may start/restart SCellDeactivationTimer for the SCell. However, in the case of SCell in which PUCCH is configured, SCellDeactivationTimer may not start/restart.

When bwp-InactivityTimer expires based on the timer value, the UE may fall back to a default BWP, and when SCellDeactivationTimer expires, the UE may deactivate the SCell.

According to the BWP switching scenario 1, the UE may control the BWP switching of the SCell based on the DCI received through a PCell. The UE receives the DCI having DCI type 1_1 from a P(S)Cell, and the DCI may include information indicating BWP switching for a predetermined SCell.

Accordingly, the UE may perform the BWP switching of the SCell based on the DCI having the DCI type 1_1. Specifically, if the SCell is a FDD cell, DL BWP switching may be performed, and if the SCell is a TDD cell, DL BWP and UL BWP may be switched together.

In addition, the UE may start or restart bwp-InactivityTimer for the SCell indicated by the DCI, and may start or restart SCellDeactivationTimer for the SCell indicated by the DCI. However, in the case of SCell in which PUCCH is configured, SCellDeactivationTimer may not start/restart.

According to the BWP switching scenario 3, the UE may control the BWP switching of a SCell based on the DCI received through PCell. The UE receives the DCI having DCI type 1_2 from a P(S)Cell, and the DCI may include information indicating BWP switching for one or more SCells.

According to this embodiment, the UE may perform the BWP switching of one or more SCells based the DCI having at least the DCI type 1_2. Specifically, if the SCell is a FDD cell, DL BWP switching may be performed, and if the SCell is a TDD cell, DL BWP and UL BWP may be switched together.

In addition, the UE may start or restart bwp-InactivityTimer for the SCell indicated by the DCI, and may start or restart SCellDeactivationTimer for the SCell indicated by the DCI. However, in the case of SCell in which PUCCH is configured, SCellDeactivationTimer may not start/restart.

According to the BWP switching scenario 2, it is possible to control the BWP switching of the PCell through the SCell. Specific details will be described with reference to FIG. 9.

Figure 9:
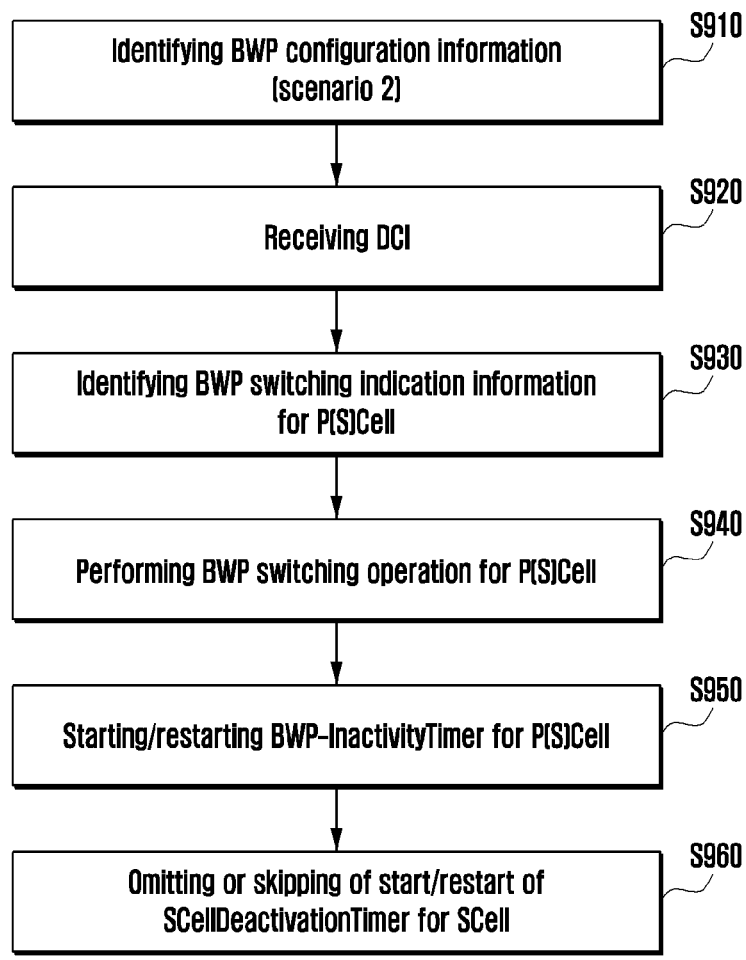
FIG. 9 is a diagram illustrating an embodiment of controlling BWP switching of a PCell through a SCell according to the disclosure.

FIG. 9 is a diagram illustrating an embodiment of controlling BWP switching of a PCell through a SCell according to the disclosure.

With reference to FIG. 9, the UE may identify configuration information for BWP switching in operation S910. The UE may identify the BWP switching method based on the configuration of information included in the configuration information for BWP switching. Specific details are the same as described above, and thus will be omitted below. In this embodiment, a case in which BWP switching is configured to be performed according to the BWP switching scenario 2 will be described as an example.

Therefore, this embodiment may correspond to a case in which the configuration information for BWP switching for a PCell does not include an own field (or a CIF presence field), and the configuration information for BWP switching for a SCell includes an own field (or a CIF presence field). In addition, an embodiment of the present disclosure may correspond to a case in which the configuration information for BWP switching for the PCell includes another field.

The UE may receive DL control information from the SCell in operation S920. The UE may receive DCI through at least one of the configured SCells. In this case, the DCI may be the DCI having DCI type (or format) 1_1. The DCI may include information indicating BWP switching for another serving cell (at least one or more of P(S)Cell and SCell). In this case, the DCI 1_1 may include at least one or more common fields and at least one or more cell specific fields, and may include, for example, at least one of the following information.

Common field (one in one DCI), including at least one of a DCI format indicator and CRC.

Cell specific fields (n in one DCI), including at least one of a carrier indicator, a BWP ID, and a frequency domain resource assignment.

The DCI may include information indicating the BWP switching for a predetermined P(S)Cell. Accordingly, the UE may identify information indicating BWP switching in operation S930. In addition, the UE may perform the BWP switching of the P(S)Cell based on the information indicating the BWP switching in operation S940. Specifically, if the P(S)Cell is a FDD cell, the UE may perform DL BWP switching. If the P(S)Cell is a TDD cell, the UE may perform DL BWP and UL BWP switching together. Accordingly, the UE may transmit and receive data in the changed BWP for a cell.

In addition, the UE may start or restart bwp-InactivityTimer of the P(S)Cell indicated by the DCI in operation S950. However, according to various embodiments, starting, restarting, or reconfiguring of the bwp-InactivityTimer of the P(S)Cell may not be performed (or the timer is not affected).

In addition, the UE may not start or restart (omit or skip) SCellDeactivationTimer for the SCell that has received the DCI in operation S960.

According to the BWP switching scenario 4, DL BWP switching or UL BWP switching of several cells may be controlled through one DCI. Specific details will be described with reference to FIG. 10.

Figure 10:
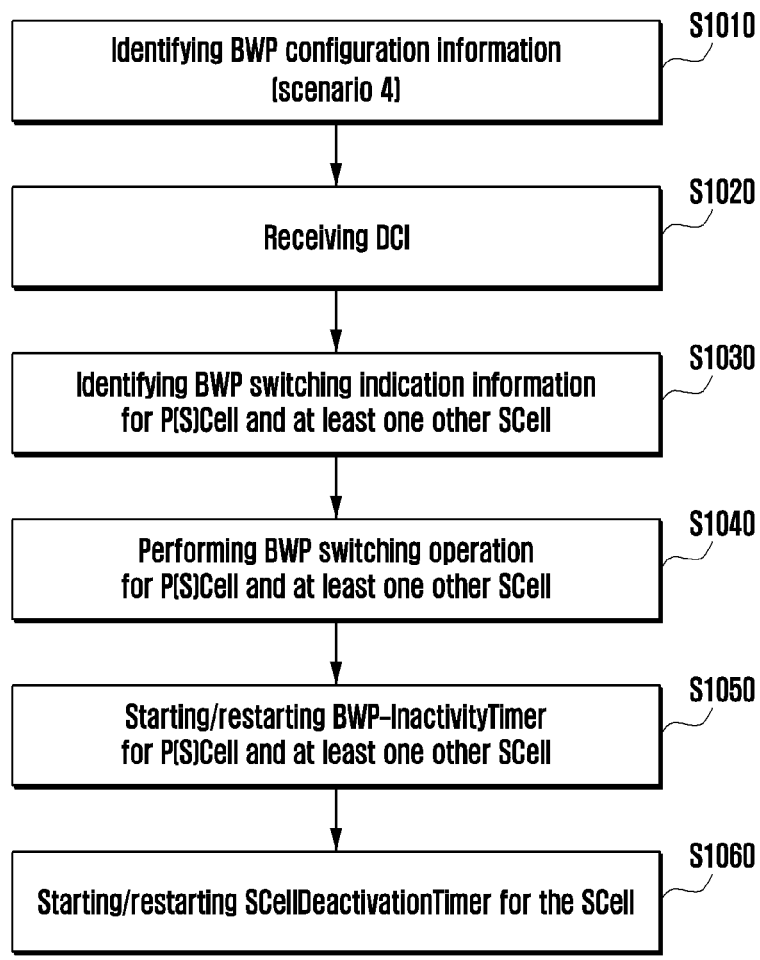
FIG. 10 is a diagram illustrating an embodiment of controlling downlink (DL) BWP switching or uplink (UL) BWP switching of a plurality of cells using downlink control information (DCI) received through one cell according to an embodiment of the disclosure.

FIG. 10 is a diagram illustrating an embodiment of controlling DL BWP switching or UL BWP switching of a plurality of cells using the DCI received through one cell according to an embodiment of the disclosure.

With reference to FIG. 10, the UE may identify configuration information for BWP switching in operation S1010. The UE may identify a BWP switching method based on the information constitution included in the configuration information for BWP switching. Specific details are the same as described above, and thus will be omitted below. In this embodiment, a case in which BWP switching is configured to be performed according to the BWP switching scenario 4 will be described as an example.

Accordingly, this embodiment may correspond to a case in which an own field (or a CIF presence field) is configured in configuration information for BWP switching for a SCell, and an own field (or a CIF presence field) is not configured in each of configuration information for BWP switching for a PCell and at least one other SCell. In the present disclosure, two or more SCells may be referred to as a first SCell and a second SCell, and the like. Alternatively, an embodiment of the present disclosure may correspond to a case in which another field is configured in each of the configuration information for BWP switching for the PCell and the at least one other SCell.

The UE may receive DL control information from the SCell in operation S1020. The UE may receive DCI through at least one of the configured SCells. In this case, the DCI may be the DCI having DCI type (or format) 1_2.

The DCI may include information indicating BWP switching for another serving cell (at least one or more of P(S)Cell and SCell). In this case, DCI 1_2 may include at least one common field and one or more cell specific fields, and may include, for example, at least one of the following information.

Common field (one in one DCI), including at least one of a DCI format indicator and CRC.

At least one cell specific fields (n in one DCI), including at least one of a carrier indicator, a BWP ID, and a frequency domain resource assignment.

Accordingly, the UE may identify information indicating BWP switching for another serving cell (at least one or more of P(S)Cell and SCell) in operation S1030. In addition, the UE may perform the BWP switching of at least one or more other serving cells (at least one or more of P(S)Cell and SCell) indicated in the DCI information in operation S1040. Specifically, if it is a FDD serving cell, DL BWP switching may be performed, and if it is a TDD serving cell, DL BWP and UL BWP may be switched together. Accordingly, the UE may transmit and receive data in the changed BWP for the corresponding cells.

Then, the UE may start or restart bwp-InactivityTimer of another serving cell indicated by the DCI in operation S1050. However, according to various embodiments, the start or restart of bwp-InactivityTimer of another serving cell not indicated by the DCI may not be performed (or the timer is not affected).

In addition, the UE may start or restart SCellDeactivationTimer of at least one or more SCells among serving cells for performing BWP switching in operation S1060.

Figure 11:
FIG. 11 is a diagram of a structure of a terminal according to an embodiment of the disclosure.

FIG. 11 is a diagram of a structure of a terminal according to an embodiment of the disclosure.

With reference to FIG. 11, a UE may include a transceiver 1110, a controller 1120, and a memory 1130. In the present disclosure, the controller may be defined as a circuit or an application-specific integrated circuit or at least one processor.

The transceiver 1110 may transmit and receive signals to and from other network entities. The transceiver 1110 may receive, for example, configuration information for cross-carrier scheduling or configuration information for BWP switching from the base station. Also, the transceiver 1110 may receive a downlink control signal from the base station.

The controller 1120 may control the overall operation of the UE according to the embodiment proposed in the present disclosure. For example, the controller 1120 may control a signal flow between the respective blocks to perform operations according to the above-described flowchart. For example, the controller 1120 may control the operation proposed in the present disclosure to control BWP switching of another cell through the cross-carrier scheduling according to an embodiment of the present disclosure.

The memory 1130 may store at least one of information transmitted and received through the transceiver 1110 and the information generated through the controller 1120.

Figure 12:
FIG. 12 is a diagram of a structure of a base station according to an embodiment of the disclosure.

FIG. 12 is a diagram of a structure of a base station according to an embodiment of the disclosure.

With reference to FIG. 12, the UE may include a transceiver 1210, a controller 1220, and a memory 1230. In the present disclosure, the controller may be defined as a circuit or an application-specific integrated circuit or at least one processor.

The transceiver 1210 may transmit and receive signals to and from other network entities. The transceiver 1210 may transmit, for example, configuration information for cross-carrier scheduling or configuration information for BWP switching to the UE. In addition, the transceiver 1210 may transmit a downlink control signal to the UE.

The controller 1220 may control the overall operation of the base station according to the embodiment proposed in the present disclosure. For example, the controller 1220 may control a signal flow between the respective blocks to perform operations according to the above-described flowchart. For example, the controller 1220 may control the operation proposed by the present disclosure to control the BWP switching of another cell through the cross-carrier scheduling according to an embodiment of the present disclosure.

The memory 1230 may store at least one of the information transmitted and received through the transceiver 1210 and the information generated through the controller 1220.

Accordingly, according to various embodiments of the present disclosure, a method performed by a terminal in a wireless communication system includes receiving configuration information for cross-carrier scheduling, identifying whether a carrier indicator field (CIF) presence field is included in the configuration information for a secondary cell (SCell), receiving downlink control information for another cell through the SCell when the CIF presence field is included, and performing BWP switching for the other cell based on the downlink control information.

In addition, according to various embodiments of the present disclosure, a method performed by a base station in a wireless communication system includes transmitting configuration information for cross-carrier scheduling; transmitting downlink control information for another cell through a secondary cell (SCell) when the carrier indicator field (CIF) presence field is included in the configuration information for the SCell; and performing BWP switching for the other cell based on the downlink control information.

In addition, according to the present disclosure, a terminal in a wireless communication system includes a transceiver; and a controller that receives configuration information for cross-carrier scheduling through the transceiver, identifies whether a carrier indicator field (CIF) presence filed is included in the configuration information for a secondary cell (SCell), receives downlink control information of another cell through the SCell when the CIF presence field is included through the transceiver, and performs BWP switching for the other cell based on the downlink control information.

In addition, according to the present disclosure, a base station in a wireless communication system includes a transceiver; and a controller that transmits configuration information for cross-carrier scheduling through the transceiver, transmits downlink control information for another cell through a secondary cell (SCell) when a carrier indicator field (CIF) presence field is included in the configuration information for the SCell through the transceiver, and performs BWP switching for the other cell based on the downlink control information.

Meanwhile, in the drawings illustrating the method of the present disclosure, the order of description does not necessarily correspond to the order of execution, and the order relationship may be changed or executed in parallel.

Alternatively, in the drawings illustrating the method of the present disclosure, some components may be omitted and only some components may be included therein without departing from the essential spirit and scope of the present disclosure.

Further, in the method of the present disclosure, some or all of the contents of each embodiment may be combined without departing from the essential spirit and scope of the invention.

What is claimed is:

1. A method performed by a terminal in a wireless communication system, the method comprising:
receiving a cross carrier scheduling configuration for a primary cell (PCell) comprising a serving cell index and information indicating a carrier indicator field (CIF) value used in a scheduling cell;
receiving a cross carrier scheduling configuration for a secondary cell (SCell) comprising information about the scheduling cell, the information about the scheduling cell comprising a CIF presence field;
receiving downlink control information (DCI) on the SCell, the DCI comprising a bandwidth part (BWP) identity (ID) and a carrier indicator indicating the PCell; and
performing BWP switching to a BWP corresponding to the BWP ID for the PCell based on the DCI received from the SCell.

2. The method of claim 1, further comprising:
starting a BWP deactivation timer based on the DCI; and
performing BWP switching to a default BWP for the PCell based on the BWP deactivation timer expiring.

3. The method of claim 1, further comprising skipping a start of a deactivation timer for the SCell,
wherein the DCI comprises at least one of: a DCI format indicator, a cyclic redundancy check (CRC), or frequency resource allocation information for a cell.

4. A method performed by a base station in a wireless communication system, the method comprising:
transmitting a cross carrier scheduling configuration for a primary cell (PCell) comprising a serving cell index and information indicating a carrier indicator field (CIF) value used in a scheduling cell;

transmitting a cross carrier scheduling configuration for a secondary cell (SCell) comprising information about the scheduling cell, the information about the scheduling cell comprising a carrier indicator field (CIF) presence field;

transmitting downlink control information (DCI) on the SCell, the DCI comprising a bandwidth part (BWP) identity (ID) and a carrier indicator indicating the PCell; and performing BWP switching to a BWP corresponding to the BWP ID for the PCell based on the DCI transmitted on the SCell.

5. The method of claim 4, wherein a BWP deactivation timer starts based on the DCI, and wherein BWP switching to a default BWP is performed based on the BWP deactivation timer expiring.

6. The method of claim 4, wherein a start of a deactivation timer for the SCell is skipped, and wherein the DCI comprises at least one of a DCI format indicator, a cyclic redundancy check (CRC), or frequency resource allocation information for a cell.

7. A terminal in a wireless communication system, the terminal comprising:

a transceiver; and a controller configured to:

receive, via the transceiver, a cross carrier scheduling configuration for a primary cell (PCell) comprising a serving cell index and information indicating a carrier indicator field (CIF) value used in a scheduling cell, receive, via the transceiver, a cross carrier scheduling configuration for a secondary cell (SCell) comprising information about the scheduling cell, the information about the scheduling cell comprising a CIF presence field, receive, via the transceiver, downlink control information (DCI) on the SCell, the DCI comprising a bandwidth part (BWP) identity (ID) and a carrier indicator indicating the PCell, and perform BWP switching to a BWP corresponding to the BWP ID for the PCell based on the DCI received from the SCell.

8. The terminal of claim 7, wherein the controller is further configured to:

start a BWP deactivation timer based on the DCI, and perform BWP switching to a default BWP for the PCell based on the BWP deactivation timer expiring.

9. The terminal of claim 7, wherein the controller is further configured to skip a start of a deactivation timer for the SCell, and wherein the DCI comprises at least one of a DCI format indicator, a cyclic redundancy check (CRC), or frequency resource allocation information for a cell.

10. A base station in a wireless communication system, the base station comprising:

a transceiver; and a controller configured to:

transmit, via the transceiver, a cross carrier scheduling configuration for a primary cell (PCell) comprising a serving cell index and information indicating a carrier indicator field (CIF) value used in a scheduling cell, transmit, via the transceiver, a cross carrier scheduling configuration for a secondary cell (SCell) comprising information about the scheduling cell, the information about the scheduling cell comprising a carrier indicator field (CIF) presence field, transmit, via the transceiver, downlink control information (DCI) on the SCell, the DCI comprising a bandwidth part (BWP) identity (ID) and a carrier indicator, and perform BWP switching to a BWP corresponding to the BWP ID for the PCell based on the DCI transmitted on the SCell.

11. The base station of claim 10, wherein the controller is further configured to:

start a BWP deactivation timer based on the DCI, and perform BWP switching to a default BWP based on the BWP deactivation timer expiring.

12. The base station of claim 10, wherein a start of a deactivation timer for the SCell is skipped, and wherein the DCI comprises at least one of a DCI format indicator, a cyclic redundancy check (CRC), or frequency resource allocation information for a cell.

* * * * *